United States Patent [19]

Foster

[11] Patent Number: 4,653,779

[45] Date of Patent: Mar. 31, 1987

[54] HOSE COUPLING AND METHOD OF MAKING THE SAME

[75] Inventor: Randy C. Foster, Springfield, Mo.

[73] Assignee: Dayco Products, Inc., Dayton, Ohio

[21] Appl. No.: 840,181

[22] Filed: Mar. 17, 1986

[51] Int. Cl.[4] ............................................ F16L 33/20

[52] U.S. Cl. ...................................... 285/256; 285/259

[58] Field of Search ................................ 285/256, 259

[56] References Cited

U.S. PATENT DOCUMENTS

| | | | |
|---|---|---|---|
| 2,661,225 | 12/1953 | Lyon | 285/259 X |
| 2,974,980 | 3/1961 | Boyle | 285/259 X |
| 3,367,683 | 2/1968 | Mattson | 285/259 X |
| 4,366,841 | 1/1983 | Currie et al. | 285/256 X |

FOREIGN PATENT DOCUMENTS

| | | |
|---|---|---|
| 510400 | 10/1979 | Australia . |
| 540851 | 10/1980 | Australia . |

*Primary Examiner*—Richard J. Scanlan, Jr.
*Attorney, Agent, or Firm*—Joseph V. Tassone

[57] ABSTRACT

A hose coupling, method of making the same, and the hose coupling in combination with a tubular hose are provided, the coupling comprising a tubular insert portion to be inserted into one end of the tubular hose and a tubular ferrule portion disposed in substantially concentric and spaced relation about the insert portion to define an annular recess therebetween and being adapated to be radially inwardly deformed toward the longitudinal axis of the coupling to clamp the end of the hose between the ferrule portion and the insert portion, the ferrule portion having a plurality of inwardly directed and axially spaced apart annular ridges for deforming into the one end of the hose with each ridge having opposed annular side faces and an inner annular free end face therebetween, each side face having a substantially straight axial cross-sectional configuration that forms an acute angle with a radially disposed centerline of its respective ridge and each free end face having a substantially straight axial cross-sectional configuration and thereby being substantially blunt, each acute angle being substantially the same as the other acute angles and the straight axial cross-sectional configuration of each free end face forming an acute angle with the longitudinal axis of the coupling.

20 Claims, 5 Drawing Figures

HOSE COUPLING AND METHOD OF MAKING THE SAME

BACKGROUND OF THE INVENTION

1. Field of the Invention

This invention relates to a new hose coupling and method of making the same as well as to the combination of such a hose coupling and a tubular hose attached thereto.

2. Prior Art Statement

It is known to provide a hose coupling adapted to be attached to an end of the tubular hose, the coupling having a longitudinal axis and comprising a tubular insert portion adapted to be inserted into one end of the hose and having an external peripheral surface that is substantially parallel to the longitudinal axis and a tubular ferrule portion disposed in substantially concentric and spaced relation about the insert portion to define an annular recess therebetween and being adapted to be radially inwardly deformed toward the longitudinal axis to clamp the end of the hose between the ferrule portion and the insert portion after the end of the hose has been received in the annular recess, the ferrule portion having a plurality of inwardly directed and axially spaced apart annular ridges for deforming into the end of the hose when the ferrule portion is radially inwardly deformed, each ridge having opposed annular side faces and an inner annular free end face therebetween, each side face having a substantially straight axial cross-sectional configuration that forms an acute angle with a radially disposed centerline of its respective ridge and each free end face having a substantially straight axial cross-sectional configuration and thereby being substantially blunt, each acute angle being substantially the same as the other acute angles. For example, see the U.S. patent to Lyon, U.S. Pat. No. 2,661,225; the U.S. patent to Mattson, U.S. Pat. No. 3,367,683 and the Australian patent to Duffield, No. 510,400.

Also see the Australian patent to Duffield et al, No. 540,851 wherein the blunt end face of each ridge of the ferrule portion has the straight axial cross-sectional configuration thereof make an acute angle with the longitudinal axis of the coupling. However, it appears that the opposed side faces of each ridge form different sized acute angles with the radial centerline of their respective ridge whereby each ridge appears to have non-symmetrical side faces.

In addition, see the U.S. patent to Currie et al, U.S. Pat. No. 4,366,841 for another example of non-symmetrical side faces on the ridges of the ferrule portion in combination with blunt end faces on such ridges.

SUMMARY OF THE INVENTION

It is one feature of this invention to provide a new hose copling wherein the ridges of the ferrule portion thereof will readily provide a good shearing action and are easily deformed by the wire reinforcement of the hose being attached to such coupling during the radially inwardly deforming of the ferrule portion over an end of the hose.

In particular, it was found according to the teachings of this invention that the bottom or inner end faces of the ridges of the ferrule portion of a hose coupling could each have a substantially straight axial cross-sectional configuration so as to be substantially blunt while having that straight axial cross-sectional configuration disposed at an acute angle relative to the longitudinal axis of the coupling so as to readily shear into the end of the hose being attached thereto during the radially inwardly compressing of the ferrule portion and then be readily deformed by the wire reinforcement of the hose wheh those blunt end faces engage against the same in order to compress the remaining portion of the hose into sealing relation against the insert portion of the coupling.

For example, one embodiment of this invention provides a hose coupling adapted to be attached to an end of a tubular hose, the coupling having a longitudinal axis and comprising a tubular insert portion adapted to be inserted into the one end of the hose and having an external peripheral surface that is substantially parallel to the longitudinal axis and a tubular ferrule portion disposed in substantially concentric and spaced relation about the insert portion to define an annular recess therebetween and being adapted to be radially inwardly deformed toward the longitudinal axis to clamp the end of the hose between the ferrule portion and the insert portion after the end of the hose has been received in the annular recess, the ferrule portion having a plurality of inwardly directed and axially spaced apart annular ridges for deforming into the end of the hose when the ferrule portion is radially inwardly deformed, each ridge having opposed annular side faces and an inner annular free end face therebetween, each side face having a substantially straight axial cross-sectional configuration that forms an acute angle with the radially disposed centerline of its respective ridge and each free end face having a substantially straight axial cross-sectional configuration and thereby being substantially blunt, each acute angle being substantially the same as the other acute angles, the straight axial cross-sectional configuration of each free end face forming a relatively small acute angle with the longitudinal axis of the coupling and with the external peripheral surface of the insert portion.

Accordingly, it is an object of this invention to provide a new hose coupling having one or more of the novel features of this invention as set forth above or hereinafter shown or described.

Another object of this invention is to provide a new method of making a hose coupling, the method of this invention having one or more of the novel features of this invention as set forth above or hereinafter shown or described.

Another object of this invention is to provide a new combination of a hose coupling and a tubular hose having one end thereof clamped in an annular recess of the coupling, the combination of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
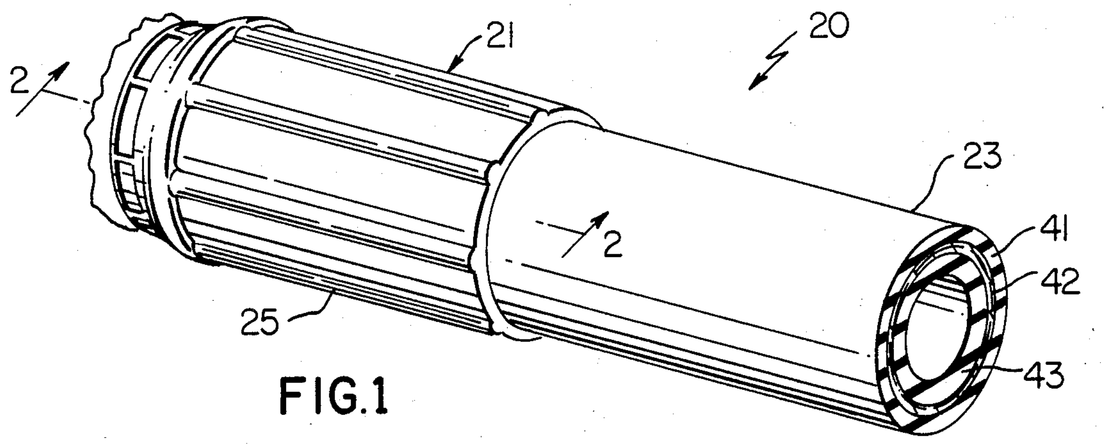
FIG. 1 is a broken away perspective view of the new hose coupling of this invention attached to a tubular hose to provide the new combination of this invention.

While the various features of this invention are hereinafter illustrated and described as being particularly adapted to provide a hose coupling for a particular tubular hose, it is to be understood that the various features of this invention can be utilized singly or in various combinations thereof to provide a hose coupling for other types of tubular hoses as desired.

Therefore, this invention is not to be limited to only the embodiment illustrated in the drawings, because the drawings are merely utilized to illustrate one of the wide variety of uses of this invention.

Figure 2:
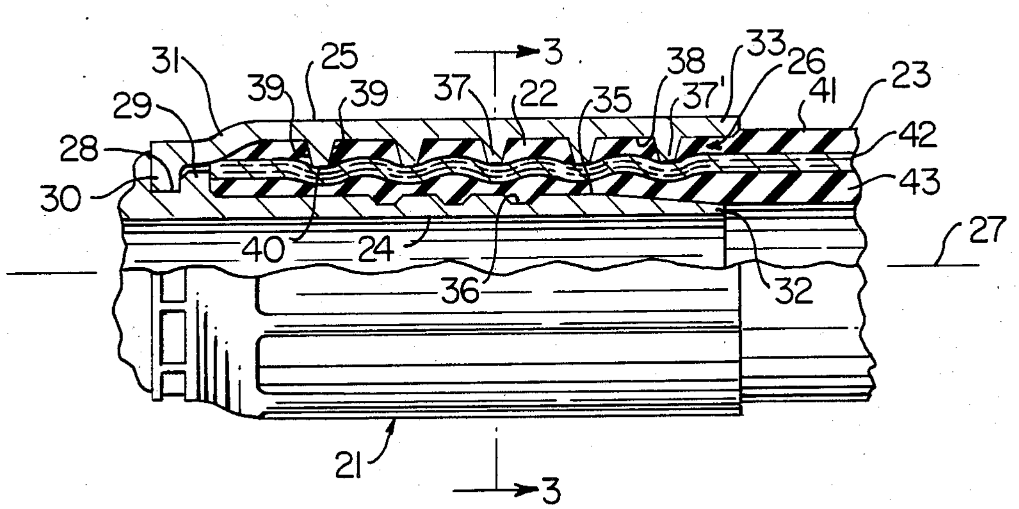
FIG. 2 is an enlarged fragmentary cross-sectional view taken on line 2—2 of FIG. 1 and is illustrated partially in elevation.
Figure 3:
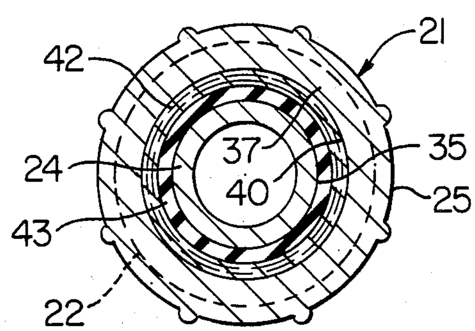
FIG. 3 is a cross-sectional view taken on line 3—3 of FIG. 2.

Referring now to FIGS. 1–3, the new combination of this invention is generally indicated by the reference numeral 20 and comprises a new hose coupling 21 of this invention clamped to an end 22 of a tubular hose 23 in a manner hereinafter set forth, the hose coupling 21 comprising a tubular insert portion 24 that is adapted to be inserted into the end 22 of the tubular hose 23 in the manner illustrated in FIGS. 2 and 4 and a tubular ferrule portion 25 disposed in substantially concentric and space relation about the insert portion 24 to define an annular recess 26 therebetween and being adapted to be radially inwardly deformed in a manner well known in the art toward a longitudinal axis 27 of the hose coupling 21 to clamp the end 22 of the hose 23 between the ferrule portion 25 and the insert portion 24 after the end 22 of the hose 23 has been received in the annular recess 26 in the manner illustrated in FIG. 4.

While the ferrule portion 25 of the coupling 21 is illustrated as being formed of metallic material and being separate from the tubular portion 24 which is also illustrated as being formed of metallic material, it is to be understood that the portions 24 and 25 could be a one-piece structure and/or could be formed of any suitable material or combination of materials as desired.

In the embodiment illustrated in the drawings, the tubular insert portion 24 of the coupling 21 has an annular groove 28 formed in an end 29 thereof and receives an annular projection 30 on an adjacent end 31 of the ferrule portion 25, the end 31 of the ferrule portion 25 having been radially inwardly deformed to cause the projection 30 thereof to be permanently received in the groove 28 of the insert portion 24 in a manner conventional in the art whereby it can be seen that the adjacent ends 29 and 31 of the insert portion 24 and the ferrule portion 25 are not only secured to each other, but also close off the left-hand end of the recess 26 in FIG. 2 while the opposed adjacent ends 32 and 33 of the insert portion 24 and ferrule portion 25 remain spaced from each other to define an annular opening 34 that leads to the annular recess 26.

The end 29 of the insert portion 24 of the coupling 21 is adapted to be provided with suitable structure (not shown) that extends beyond the end 31 of the ferrule portion 25 to couple to additional conduit structure in a manner conventional in the art.

The tubular insert portion 24 of the coupling 21 has an external peripheral surface 35 thereof formed with a plurality of annular grooves or recesses 36 disposed in axially spaced relation and being utilized for facilitating the clamping of the end 22 of the hose 23 thereto as will be apparent hereinafter and with the external peripheral surface of the insert portion.

Figure 4:
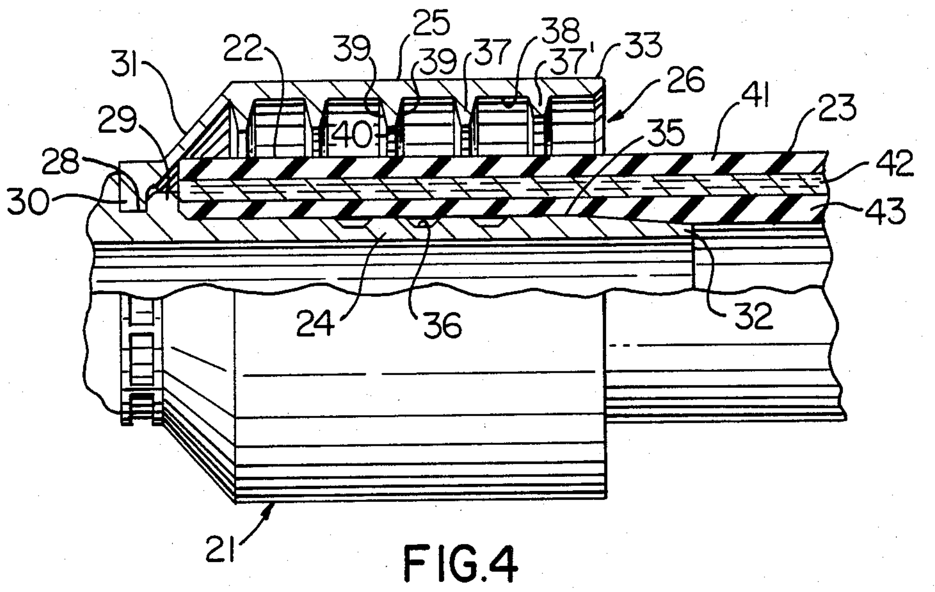
FIG. 4 is a view similar to FIG. 2 and illustrates the hose coupling and tubular hose before the ferrule portion of the hose coupling has been inwardly deformed.

In addition, the external peripheral surface 35 of the insert portion 24 of the hose coupling 21 is beveled or inwardly flared at the end 32 thereof to facilitate the insertion of the insert portion 24 into the end 22 of the hose 23 when the same is assembled thereon in the manner illustrated in FIG. 4 and in a manner conventional in the art.

The ferrule portion 25 of the hose coupling 21 has a plurality of axially spaced apart annular integral ridges 37 that extend inwardly from an internal peripheral surface 38 thereof, each ridge 37 having opposed annular side faces 39 and an inner annular free end face 40 therebetween. Each ridge 37 is substantially identical to the other ridges 37 except for the ridge 37' at the end 33 of the ferrule portion 25 which is slightly shorter in length than the other ridges 37 for stress relief purposes as is well known in the art.

In general, when the ferrule portion 25 of the coupling 21 is subsequently radially inwardly deformed by conventional apparatus in a manner well known in the art so as to clamp the end 22 of the hose 23 between the ferrule portion 25 and the insert portion 24 as illustrated in FIG. 2, the ridges 37 penetrate or shear through an outer polymeric cover layer 41 of the hose 23 until the ridges 37 engage against a wire reinforcement means 42 of the hose 23 which is disposed intermediate the outer polymeric cover layer 41 and an inner polymeric layer means 43 of the hose 23 whereby further inward radial deforming of the ferrule portion 25 causes the ridges 37 to deform the wire reinforcement means 42 into the undulating shape illustrated in FIG. 2 by inwardly compressing and deforming the inner polymeric layer means 43 to firmly seal against the external peripheral surface 35 of the insert portion 24 as well as to penetrate into the annular grooves 36 thereof and thereby firmly clamp the end 22 of the hose 23 between the ferrule portion 25 and insert portion 24. The ridges 37 do not shear through the wire reinforcement 42 and are in fact deflected thereby as is well known in the art whereby it can be seen that the hose coupling 21 fastens to the end 22 of the hose 23 in a manner similar to the couplings of the aforementioned U.S. patent to Lyon, U.S. Pat. No. 2,661,225; the U.S. patent to Mattson, U.S. Pat. No. 3,367,683; the U.S. patent to Currie et al, U.S. Pat. No. 4,366,841; the Australian patent to Duffield, No. 510,400 and the Australian patent to Duffield et al, No. 540,851 whereby these three U.S. patents and two Australian patents are being incorporated into this disclosure by this reference thereto.

However, as previously stated, it was found according to the teachings of this invention that the profiles of the annular ridges 37 of the ferrule portion 25 could be so uniquely constructed and arranged that the same would provide a good shearing action when crimped into the end 22 of the hose 23 and be easily deformed by the wire reinforcement means 42 so as to substantially eliminate any cutting of the wires of the wire reinforcement means 42 and increase the "bite" thereof as the wire reinforcement means 42 is being further deformed by the ridges 37 into the undulating shape between the ridges 37 as illustrated in FIG. 2 which can define a modified cycloid and thereby cause compression to be transmitted radially inwardly and thereby have the internal peripheral surface 44 of the hose 23 effect a good seal on the external peripheral surface 35 of the insert portion 24.

Figure 5:
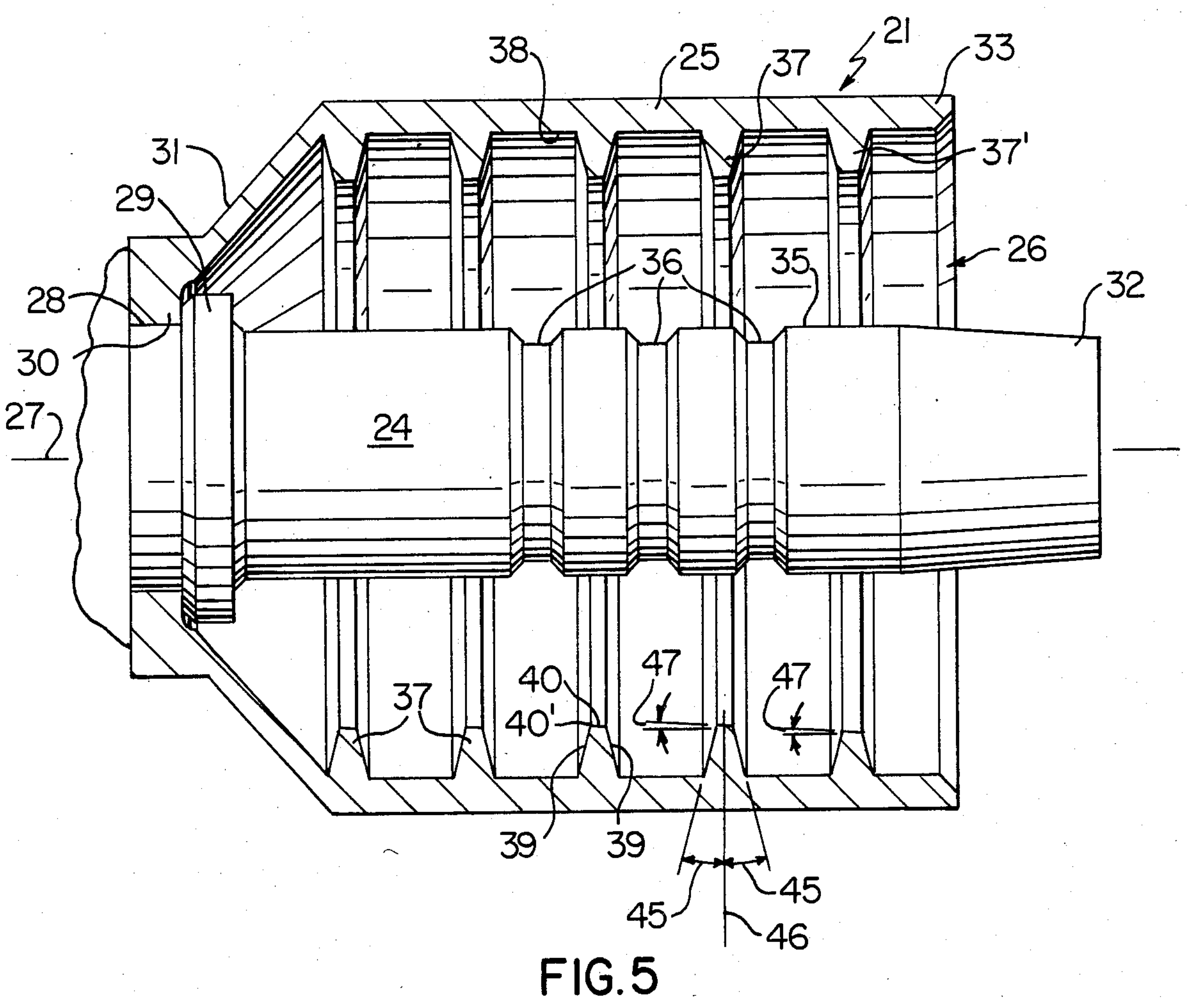
FIG. 5 is an enlarged cross-sectional view of the hose coupling in the non-deformed condition of FIG. 4, FIG. 5 illustrating the insert portion of the hose coupling in elevation.

In particular, reference is now made to FIG. 5 wherein it can be seen that the annular ridges 37, before the ferrule portion 25 has been radially inwardly deformed, each has the side faces 39 thereof formed with substantially straight axial cross-sectional configuration that respectively make the same acute angles 45 with a radial centerline 46 of the respective ridge 37 so that the opposed side faces 39 of each ridge 37 taper inwardly toward each other as they extend radially inwardly toward the free end face 40 thereof.

However, the free end face 40 of each ridge 37, before the ferrule portion 25 has been radially inwardly deformed, defines an axial cross-sectional configuration that is substantially straight so as to be substantially blunt while making an acute angle 47 with the longitudinal axis 27 of the hose coupling 21. In this manner, the free end faces 40 of the ridges 37 slightly face toward the adjacent ends 32 and 33 of the insert portion 24 and ferrule portion 25 as illustrated in FIG. 5 and thereby define sharp corners or edges 40' with their respective faces 39 that face torward the other adjacent ends 29 and 31 of the insert portion 24 and the ferrule portion 25 which provide the initial shearing action through the outer layer 41 of the hose 23 as well as cause the ridges 37 to deflect when the edges 40' thereof initially engage the wire reinforcement means 42 so as to not cut into the same and increase the "bite" of the ridges 37 in deforming the wire reinforcing means 42 therebetween for holding the end 22 of the hose 23 in the recess 26 of the coupling 21.

Thus, it can be seen that each side face 39 of each annular ridge 37 has the substantially flat or straight axial cross-sectional configuration thereof make an angle 45 with the radial centerline 46 of its respective ridge 37 that is substantially the same as the acute angles 45 of the other side faces 39 of the ridges 37. Likewise, each free end face 40 of each annular ridge 37 has its substantially flat or straight axial cross-sectional configuration make an acute angle 47 with the longitudinal axis 27 of the hose coupling 21 that is substantially the same as the acute angles 47 made by the other end faces 40 of the other ridges 37.

It was found according to the teachings of this invention that the acute angles 45 for the side faces 39 of the ridges 37 should each be approximately 15 degrees and that the acute angles 47 for the free end faces 40 of the ridges 37 should each be approximately 3 degrees.

One embodiment of a hose coupling 21 of this invention that has been successfully utilized with the aforementioned acute angles 45 and 47 of 15 degrees and 3 degrees respectively, has the insert portion 24 thereof formed of cold drawn carbon steel with the external peripheral surface 35 thereof defining a diameter of approximately 0.380 of an inch and having a length of approximately 1.375 inches. The three annular grooves 36 in the peripheral surface 35 are disposed approximately 0.090 of an inch apart and are approximately 0.090 of an inch wide at the mouth thereof. The ferrule portion 25 of such coupling 21 is also formed of cold drawn carbon steel and has the internal peripheral surface 38 thereof define an internal diameter of approximately 1,000 inch in its non-deformed configuration of FIG. 5 with each of the five ridges 37 thereof being approximately 0.062 of an inch wide at the internal peripheral surface 38 and approximately 0.018 of an inch wide at the free end face 40 thereof while being approximately 0.0825 of an inch in radial length except for the trailing ridge 37' which has an end face 40 that is approximately 0.026 of an inch wide and a radial length of approximately 0.0675 of an inch. The ridges 37 are spaced apart approximately 0.200 of an inch at the radial centerlines 46 thereof.

It is to be understood that the aforementioned dimensions for the embodiment of the hose coupling 21 of this invention that has been used successfully are not to be a limitation on this invention and are merely set forth in order to fully disclose one embodiment of this invention.

Therefore, it can be seen that this invention not only provides a new hose coupling and method of making the same, but also this invention provides a new combination of the hose coupling and a hose having one end thereof clamped in the annular recess of the hose coupling.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the impovement" whereby it is believed that each claim sets forth a novel, useful and unobvious invention within the purview of the Patent Statute.

What is claimed is:

1. In a hose coupling adapted to be attached to an end of a tubular hose, said coupling having a longitudinal axis and comprising a tubular insert portion adapted to be inserted into said one end of said hose and having an external peripheral surface that is substantially parallel to said longitudinal axis, and a tubular ferrule portion disposed in substantially concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said ferrule portion having a plurality of inwardly directed and axially spaced apart annular ridges for deforming into said end of said hose when said ferrule portion is radially inwardly deformed, each said ridge having opposed annular side faces and an inner annular free end face therebetween, each said side face having a substantially straight axial cross-sectional configuration that forms an acute angle with a radially disposed centerline of its respective ridge and each said free end face having a substantially straight axial cross-sectional configuration and thereby being substantially blunt, each said acute angle being substantially the same as the other said acute angles, the improvement wherein said straight axial cross-sectional configuration of each said free end face forms a relatively small acute angle with said longitudinal axis of said coupling and with said external peripheral surface of said insert portion.

2. A hose coupling as set forth in claim 1 wherein each said acute angle of said free end faces of said ridges is substantially the same as the other said acute angles of said free end faces.

3. A hose coupling as set forth in claim 1 wherein each said acute angle of said side faces of said ridges is approximately 15 degrees.

4. A hose coupling as set forth in claim 1 wherein each said acute angle of said free end faces of said ridges is approximately 3 degrees.

5. A hose coupling as set forth in claim 1 wherein each said acute angle of said side faces of said ridges is approximately 15 degrees and each said acute angle of said free end faces of said ridges is approximately 3 degrees.

6. A hose coupling as set forth in claim 1 wherein said portions each has opposed ends disposed respectively adjacent said opposed ends of the other said portion, one pair of said adjacent ends closing off said recess and the other pair of said adjacent ends being spaced from each other to define an annular opening leading to said annular recess.

7. A hose coupling as set forth in claim 6 wherein said free end faces of said ridges all face slightly toward said other pair of said adjacent ends.

8. In a method for making a hose coupling that is adapted to be attached to an end of a tubular hose, said coupling having a longitudinal axis and comprising a tubular insert portion adapted to be inserted into said one end of said hose and having an external peripheral surface that is substantially parallel to said longitudinal axis and a tubular ferrule portion disposed in substantially concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said method comprising the steps of forming said ferrule portion to have a plurality of inwardly directed and axially spaced apart annular ridges for deforming into said end of said hose when said ferrule portion is radially inwardly deformed, forming each said ridge to have opposed annular side faces and an inner annular free end face therebetween, forming each said side face to have a substantially straight axial cross-sectional configuration that forms an acute angle with a radially disposed centerline of its respective ridge, forming each said acute angle to be substantially the same as the other said acute angles, and forming each said free end face to have a substantially straight axial cross-sectional configuration and thereby be substantially blunt, the improvement comprising the step of forming said straight axial cross-sectional configuration of each said free end face to form a relatively small acute angle with said longitudinal axis of said coupling and with said external peripheral surface of said insert portion.

9. A method as set forth inclaim 8 and including the step of forming each said acute angle of said free end faces of said ridges to be substantially the same as the other said acute angles of said free end faces.

10. A method as set forth in claim 8 and including the step of forming each said acute angle of said side faces of said ridges to be approximately 15 degrees.

11. A method as set forth in claim 8 and including the step of forming each said acute angle of said free end faces of said ridges to be approximately 3 degrees.

12. A method as set forth in claim 8 and including the steps of forming each said acute angle of said side faces of said ridges to be approximately 15 degrees, and forming each said acute angle of said free end faces of said ridges to be approximately 3 degrees.

13. A method as set forth in claim 8 and including the step of forming said portions to each have opposed ends disposed respectively adjacent said opposed ends of the other said portion with one pair of said adjacent ends closing off said recess and the other pair of said adjacent ends being spaced from each other to define an annular opening leading to said annular recess.

14. A method as set forth in claim 13 and including the step of forming said free end faces of said ridges to all face slightly toward said other pair of said adjacent ends.

15. In a combination of a hose coupling and a tubular hose having one end thereof clamped in an annular recess of said coupling, said coupling having a longitudinal axis and comprising a tubular insert portion inserted into said end of said hose and having an external peripheral surface that is substantially parallel to said longitudinal axis and a tubular ferrule portion disposed in substantially concentric and spaced relation about said insert portion to define said annular recess therebetween and being radially inwardly deformed toward said longitudinal axis so as to clamp said end of said hose between said ferrule portion and said insert portion, said ferrule portion having a plurality of inwardly directed and axially spaced apart annular ridges deformed into said end of said hose, each said ridge having opposed annular side faces and an inner annular free end face therebetween, each said side face before said ferrule portion was deformed having a substantially straight axial cross-sectional configuration that forms an acute angle with a radially disposed centerline of its respective ridge and each said free end face before said ferrule portion was deformed having a substantially straight axial cross-sectional configuration and thereby being substantially blunt, each said acute angle was substantially the same as the other said acute angles, the improvement wherein said straight axial cross-sectional configuration of each said free end face initially forms a relatively small acute angle with said longitudinal axis of said coupling and with said external peripheral surface of said insert portion.

16. A configuration as set forth in claim 15 wherein each said acute angle of said free end faces of said ridges was substantially the same as the other said acute angles of said free end faces.

17. A combination as set forth in claim 15 wherein each said acute angle of said side faces of said ridges was approximately 15 degrees.

18. A combination as set forth in claim 15 wherein each said acute angle of said free end faces of said ridges was approximately 3 degrees.

19. A combination as set forth in claim 15 wherein each said acute angle of said side faces of said ridges was approximately 15 degrees and each said acute angle of said free end faces of said ridges was approximately 3 degrees.

20. A combination as set forth in claim 15 wherein said portions each has opposed ends disposed respectively adjacent said opposed ends of the other said portion, one pair of said adjacent ends closing off said recess and the other pair of said adjacent ends being spaced from each other to define an annular opening leading to said annular recess, said free end faces of said ridges all faced slightly toward said other pair of said adjacent ends before said ferrule portion was deformed.

* * * * *